(12) United States Patent
Sung

(10) Patent No.: US 7,384,436 B2
(45) Date of Patent: Jun. 10, 2008

(54) POLYCRYSTALLINE GRITS AND ASSOCIATED METHODS

(76) Inventor: Chien-Min Sung, No. 4, Lane 32, Chung-Cheng Road, Tansui, Taipei County (TW) 23911

( * ) Notice: Subject to any disclaimer, the term of this patent is extended or adjusted under 35 U.S.C. 154(b) by 386 days.

(21) Appl. No.: 10/925,894

(22) Filed: Aug. 24, 2004

(65) Prior Publication Data

US 2006/0042172 A1    Mar. 2, 2006

(51) Int. Cl.
*B24D 3/00* (2006.01)
*B24D 17/00* (2006.01)
*B24D 18/00* (2006.01)
*C09K 3/14* (2006.01)

(52) U.S. Cl. ............... 51/293; 51/298; 51/303; 51/295; 51/307; 51/309; 264/122; 264/125; 264/129; 264/138

(58) Field of Classification Search ............... 51/293, 51/298, 303, 295, 307–309; 264/122, 125, 264/129, 138
See application file for complete search history.

(56) References Cited

U.S. PATENT DOCUMENTS

| | | | |
|---|---|---|---|
| 3,631,638 A | 1/1972 | Yoshikawa et al. | |
| 3,819,814 A | 6/1974 | Pope | |
| 4,078,906 A | 3/1978 | Green | |
| 4,188,194 A | 2/1980 | Corrigan | |
| 4,224,380 A | 9/1980 | Bovenkerk et al. | |
| 4,289,503 A | 9/1981 | Corrigan | |
| 4,525,179 A | 6/1985 | Gigl | |
| 4,629,373 A | 12/1986 | Hall | |
| 4,776,861 A | 10/1988 | Frushour | |
| 4,797,241 A | 1/1989 | Peterson et al. | |
| 4,828,582 A | 5/1989 | Frushour | |
| 4,923,490 A | 5/1990 | Johnson et al. | |
| 5,037,451 A | 8/1991 | Burnand et al. | |
| 5,043,120 A | 8/1991 | Corrigan | |
| 5,151,107 A | 9/1992 | Cho et al. | |
| 5,194,071 A | 3/1993 | Corrigan et al. | |
| 5,364,423 A | 11/1994 | Bigelow et al. | |
| 5,985,228 A | 11/1999 | Corrigan et al. | |
| 6,054,183 A | 4/2000 | Zimmer et al. | |
| 6,179,886 B1 | 1/2001 | Gordeev et al. | |
| 6,206,942 B1 * | 3/2001 | Wood | 51/309 |
| 6,258,237 B1 | 7/2001 | Gal-Or et al. | |
| 6,284,556 B1 | 9/2001 | Wang et al. | |
| 6,605,798 B1 | 8/2003 | Cullen | |
| 6,616,725 B2 | 9/2003 | Cho et al. | |
| 2001/0003884 A1 * | 6/2001 | Wei et al. | 51/298 |
| 2004/0060243 A1 | 4/2004 | Fries et al. | |
| 2004/0079033 A1 * | 4/2004 | Long | 51/297 |
| 2005/0032462 A1 * | 2/2005 | Gagliardi et al. | 451/8 |

* cited by examiner

*Primary Examiner*—Michael A Marcheschi
(74) *Attorney, Agent, or Firm*—Thorpe North & Western LLP (57) ABSTRACT

Polycrystalline grits and methods of making grits which allow for a high degree of shape and size distribution control, as well as improved abrasive performance are described and disclosed. In one aspect, an abrasive slurry can be formed into a plurality of abrasive precursors arranged on a substrate using screen-printing or other techniques. The abrasive slurry can include a binder and a plurality of abrasive particles. The abrasive precursors on the substrate can then be covered with a pressure medium and then subjected to pressure and temperature conditions sufficient to cause sintering of the abrasive particles to form polycrystalline grits. The polycrystalline grits produced by such methods can have a substantially uniform shape and size distribution.

26 Claims, 2 Drawing Sheets

POLYCRYSTALLINE GRITS AND ASSOCIATED METHODS

FIELD OF THE INVENTION

The present invention relates to methods for use in connection with producing abrasive particles. More particularly, the present invention relates to polycrystalline grits and accompanying methods for making such grits. Accordingly, the present invention involves the fields of chemistry, metallurgy, materials science, and high pressure technology.

BACKGROUND OF THE INVENTION

Abrasive particles have long been used in numerous applications, including cutting, drilling, sawing, grinding, lapping and polishing of materials. A wide variety of abrasive particles can be used, depending on the specific application and workpiece. Typically, extraordinarily hard abrasive particles such as diamond and cubic boron nitride (cBN) are referred to as superabrasive particles.

Abrasive and superabrasive particles can be single crystal grits or polycrystalline grits. Most often, single crystal grits can be produced by nucleation and growth in the presence of a catalyst under high pressure and high temperature. For example, graphite powder and a catalyst, e.g., Fe, Co, Ni, or their alloys, can be layered or mixed and placed in a high pressure apparatus. Although a number of high pressure apparatuses are known, the two most common apparatuses are the cubic press and belt press. Cubic presses are typically cheaper and easier to operate, but also have limited reaction volumes. Similarly, belt apparatuses can provide larger reaction volumes, but tend to be more expensive and difficult to operate successfully. At sufficiently high temperatures and pressures within the stability region of diamond, graphite can dissolve in the molten catalyst and precipitate as diamond. Alternatively, graphite can be dispersed as flakes in the molten catalyst which then precipitates as diamond. Generally, a higher growth rate corresponds to more crystal defects, while a longer growth time allows for increased particle size. Similar behavior occurs during growth of cBN and other abrasive particles. For example, high pressure and high temperature growth of cBN can be realized using hexagonal boron nitride (hBN) and a catalyst such as an alkali metal nitride or alkaline earth metal nitride.

Abrasive grits can be further processed to form various products. For example, abrasive grits can be pulverized to form smaller abrasive fines, e.g., as small as about 0.1 μm. Alternatively, micron powder of superabrasive can be sintered to form larger abrasive bodies such as polycrystalline diamond (PCD) or polycrystalline cBN (PcBN). These larger PCD and PcBN compacts are often supported by a metal substrate, such as cemented tungsten carbide to reinforce their impact strength.

Costs of production per unit weight for superabrasive compacts tend to increase with increasing particle size, primarily due to the time required to grow large crystals. Conversely, the cost of production for abrasive compacts tends to decrease with increasing size. Thus, abrasive grit sizes seldom exceed about 1 mm, while abrasive compacts are generally larger than about 3 mm in diameter and are frequently up to several centimeters in size.

The cutting and material removal properties of single crystal particles and polycrystalline bodies can differ considerably. Specifically, polycrystalline bodies have randomly oriented microscopic grains corresponding to individual grains. This makes the polycrystalline bodies more impact resistant than single crystal particles which tend to fracture along cleavage planes which often results in shattering or failure of the entire single crystal particle as a useful abrasive particle. Further, as polycrystalline bodies fracture on a microscale, the fractures expose new sharp edges and help to maintain abrasive properties over a longer useful life. Additionally, polycrystalline bodies tend to have rougher surfaces than single crystals, making bonding with various tool matrices more secure.

In order to take advantage of the properties of polycrystalline bodies, a number of methods have been developed to produce polycrystalline particles or grits. Several common methods involve production of PCD or PcBN compacts which can then be crushed, milled, and/or acid leached to form smaller grits. While such processes do produce useful grits, they tend to have highly irregular shapes and broad particle size distributions. Another method includes cutting larger PCD bodies using wire electrical discharge machining or laser to cut the PCD bodies into smaller particles. However, this method tends to be expensive and time consuming, despite improved regular shapes and consistent size distributions.

As such, methods and materials for improved polycrystalline grits and methods of producing them continue to be sought.

SUMMARY OF THE INVENTION

Accordingly, the present invention provides a method for forming polycrystalline grits which allows for a high degree of shape and size distribution control, as well as improved abrasive performance. In one aspect of the present invention, a method of forming polycrystalline grits can include forming an abrasive slurry into a plurality of abrasive precursors arranged on a substrate. The abrasive slurry can include a binder and a plurality of abrasive particles. Once on the substrate, the binder can be optionally removed in a dewaxing step. Further, the abrasive precursors can be at least partially covered with a pressure medium to form a precursor assembly. The precursor assembly can then be subjected to pressure and temperature conditions sufficient to cause sintering of the abrasive particles to form polycrystalline grits.

In one detailed aspect of the present invention, the abrasive particles can include materials such as diamond, nanodiamond, cubic boron nitride, silicon carbide, quartz, corundum, silicon nitride, boron nitride, tungsten carbide, titanium carbide, zirconium carbide, zinc oxide, zirconia, alumina, aluminum nitride, titanium nitride, zirconium nitride, and mixtures or composites thereof.

In another detailed aspect of the present invention, the abrasive slurry can further include a sintering aid which is chosen for enhancing sintering of a particular type of abrasive particle.

In yet another detailed aspect, the abrasive slurry can further include a liquid thinner. The content of liquid thinner can be adjusted to facilitate formation of abrasive precursors using a variety of printing or other techniques.

In still another aspect of the present invention, the abrasive precursors can be formed by printing and lithographic techniques such as screen-printing or the like.

In another aspect of the present invention, a plurality of precursor assemblies can be assembled to form a multi-layered precursor assembly. This configuration can allow for maximizing usage of limited reaction volumes in high pressure devices and increased production volumes.

In yet another aspect of the present invention, polycrystalline grits can be formed which include sintered abrasive particles. These polycrystalline grits can have substantially unaltered surfaces. A wide variety of shapes and sizes of polycrystalline grits can be readily manufactured. Additionally, the polycrystalline grits produced by the methods of the present invention can have a substantially uniform shape and size distribution. In many cases, the uniformity can be characterized by a size distribution of less than about 50 µm, and in some cases less than about 5 µm. Further, polycrystalline grits can be formed which allow for microfracture during abrasive applications such that their useful is extended and cutting speed can be maintained over extended periods of time.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an," and "the" include plural referents unless the context clearly dictates otherwise. Thus, for example, reference to "an abrasive precursor" includes one or more of such precursors, reference to "a pressure medium" includes reference to one or more of such materials, and reference to "a printing process" includes reference to one or more of such processes.

Definitions

In describing and claiming the present invention, the following terminology will be used in accordance with the definitions set forth below.

As used herein, "polycrystalline grits" refers to small particulates having multiple crystalline structures. Typically, the polycrystalline grits are a mass of sintered single crystals (or smaller polycrystalline crystals), often with a small amount of sintering aid. Further, the term "grits" indicates a particle size within a range that is well known to those of ordinary skill in the art. However, in some aspects, such particles are most often less than about 2 mm. This is in contrast to larger polycrystalline compacts which can be up to several centimeters across and tens of millimeters thick.

As used herein, "pressure medium" refers to any material which can be used to improve homogeneous pressure distribution throughout a precursor assembly during application of pressure.

As used herein, "precursor assembly" refers to an unsintered mass of abrasive particles formed in discrete abrasive precursor bodies each substantially separated by a pressure medium. A precursor assembly can refer to the assembly either before or after dewaxing to remove binder and/or other organic constituents, as well as any other point between formation of the assembly and sintering thereof.

As used herein, "nanodiamond" refers to carbonaceous particles having crystal sizes in the nanometer range, i.e. about 1 nm to about 20 nm. Further, nanodiamond is intended to refer to particles having nanometer scale crystal structure. Nanodiamond particles can be formed using a number of known techniques. One nanodiamond formation technique involves the explosion of dynamite or other explosives to produce nanodiamond having nanocrystalline structure and has particle sizes in the range of from about 2 to about 10 nm. In contrast, typical fine diamond particles have a particle size larger than about 0.1 µm.

As used herein, "crystal" is to be distinguished from "particle." Specifically, a crystal refers to a structure in which the repeated or orderly arrangement of atoms in a crystal lattice extends uninterrupted, although defects may be present. Many crystalline solids are composed of a collection of multiple crystals or grains. A particle can be formed of a single crystal or from multiple crystals as individual crystals grow sufficient that adjacent crystals impinge on one another to form grain boundaries between crystals. Thus, each crystal within a polycrystalline particle can have a random orientation.

As used herein, "metallic" refers to a metal, or an alloy of two or more metals. A wide variety of metallic materials is known to those skilled in the art, such as aluminum, copper, chromium, iron, steel, stainless steel, titanium, tungsten, zinc, zirconium, molybdenum, etc., including alloys and compounds thereof.

As used herein, "dewaxing" refers to a heating process for removing organic constituents from a mass of abrasive particles and/or metallic material. As such, dewaxing is not limited to removal of waxes and/or paraffins, but can encompass any solvent removal, e.g., water or other liquid thinners such as those which merely evaporate upon heating.

As used herein, "substantially unaltered surface" refers to a particle surface which has not been modified subsequent to sintering. However, post-sintering processes such as cleaning, milling to remove burrs, reactions with atmospheric elements such as oxidation, or the like can be useful for improving the quality of the final polycrystalline grits while also leaving substantially unaltered surfaces. For example, a substantially unaltered surface exists substantially as produced during sintering of a polycrystalline grit. Cutting processes such as laser, wire EDM, and the like can introduce artifacts and surface irregularities which are not found in substantially unaltered surfaces. Thus, a polycrystalline grit having a substantially unaltered surface indicates an absence of post-sintering processes such as cutting, crushing, chemical leaching, or the like which substantially alter the surfaces of the polycrystalline grit.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a numerical range of "about 1 micrometer to about 5 micrometers" should be interpreted to include not only the explicitly recited values of about 1 micrometer to about 5 micrometers, but also include individual values and sub-ranges within the indicated range. Thus, included in this numerical range are individual values such as 2, 3, and 4 and sub-ranges such as from 1-3, from 2-4, and from 3-5, etc.

This same principle applies to ranges reciting only one numerical value. Furthermore, such an interpretation should apply regardless of the breadth of the range or the characteristics being described.

Invention

In accordance with an aspect of the present invention, a method of forming polycrystalline grits can include forming an abrasive slurry which can be formed into abrasive precursors in various shapes and sizes. The abrasive slurry can include a binder and a plurality of abrasive particles.

In one aspect of the present invention, the abrasive particles can be any abrasive particle which can be useful for removing materials from a workpiece. Suitable abrasive particles can include, but are not limited to, diamond, nanodiamond, cubic boron nitride, silicon carbide, quartz, corundum, i.e. sapphire, silicon nitride, boron nitride, tungsten carbide, titanium carbide, zirconium carbide, zinc oxide, zirconia, alumina, aluminum nitride, titanium nitride, zirconium nitride, and mixtures or composites thereof. In one specific embodiment, the abrasive particles can be superabrasive particles such as nanodiamond, diamond, cubic boron nitride, or mixtures thereof. Depending on the intended application, various abrasives can be more or less suitable. For example, nanodiamond particles can be desirable for polishing applications, while diamond particles can be more useful for cutting applications requiring removal of large volumes of material. The abrasive particles can have an average particle size from about 3 nm to about 500 μm, and in some cases can have an average particle size from about 1 μm to about 50 μm. Although the exact composition can vary, the abrasive slurry can typically comprise from about 40 vol % to about 95 vol % abrasive particles.

In one aspect, the abrasive particles can be diamond particles. Diamond superabrasive particles can be useful in a wide variety of applications. Typically, diamond can be suitable for applications which require high removal rates for relatively hard materials such as granite, metals, or the like. In yet another alternative embodiment, the polycrystalline grits can include both diamond and cBN particles in various proportions. For example, this composite polycrystalline composition can be useful for cutting steel and non-steel compositions, e.g., steel reinforced concrete.

In another aspect, the abrasive particles can be nanodiamond particles produced from explosion synthesis. These nanodiamond particles are not produced by pulverizing or milling larger particles. Without being bound to any particular theory, it appears that nanodiamond particles formed by explosion synthesis are formed in situ via crystallization of a liquid solution of diamond. Additionally, explosion synthesis nanodiamond particles include a high content of defects. These defects are on a sub-nanoscale and tend to allow the nanodiamond particles to cleave and chip along these sub-nanoscale defects during use. Thus, as the nanodiamond particles become worn, the particles can chip and break to expose sub-nanoscale cutting surfaces. As a result, these nanodiamond particles do not slide along the surface of a workpiece, but rather cut and remove material on a sub-nanoscale.

Prior to formation of the slurry, the abrasive particles can be cleaned, if necessary. This can help to improve sintering of particles by removing foreign material which can interfere with contact and growth of particles during sintering. For example, the abrasive particles can be mixed in an organic solvent, e.g., trimethylethane, an acid, e.g., HCl, and a fused salt, e.g., $NaNO_3$. The abrasive particles can then be rinsed in deionized water and dried.

In another aspect of the present invention, the abrasive slurry can further include a sintering aid. The sintering aid can be any material capable of enhancing sintering of the abrasive particles. Non-limiting examples of suitable sintering aids for diamond materials include Fe, Co, Ni, Mn, Cr, and alloys thereof. Alloys of iron and nickel have proven useful in connection with the present invention and are readily commercially available. Several common metal catalyst alloys can include Fe—Ni, e.g., INVAR alloys, Fe—Co, Ni—Mn—Co, and the like. Currently preferred metal catalyst materials are Fe—Ni alloys, such as Fe-35Ni, Fe-31Ni-5Co, Fe-30Ni, and other INVAR alloys, with Fe-35Ni being most preferred and more readily available. One additional preferred metal catalyst include cobalt and alloys thereof. In addition, the catalyst materials for diamond synthesis can include additives which control the growth rate of diamond, i.e. via suppressing carbon diffusion, and also prevent excess nitrogen and/or oxygen from diffusing into the diamond. Suitable additives can include Mg, Ca, Si, Mo, Zr, Ti, V, Nb, Zn, Y, W, Cu, Al, Au, Ag, Pb, B, Ge, In, Sm, and compounds of these materials with C and B.

Similarly, catalyst materials suitable for cBN can include any catalyst capable of promoting growth of cBN from suitable boron nitride raw materials. Non-limiting examples of catalyst materials suitable for cBN synthesis can include alkali metals, alkaline earth metal, nitrides thereof, Al—Si alloys, and compounds thereof. Several specific examples of such catalyst materials can include, without limitation, lithium, calcium, magnesium, and nitrides of alkali and alkaline earth metals such as $Li_3N$, $Ca_3N_2$, $Mg_3N_2$, $CaBN_2$, and $Li_3BN_2$.

The specific amount of sintering aid can vary; however, excessively high sintering aid content can result in formation of weak abrasive grits. Similarly, low concentrations of sintering aid can result in slow growth rates and/or poor crystal quality, i.e. high defect rates. As a general guideline, the sintering aid can comprise from about 10 vol % to about 50 vol % of the dewaxed abrasive precursor. During sintering, much of the sintering aid will tend to migrate out of the abrasive particles and is present in the final product in relatively small amounts. Further, the sintering aid content of the final product can be reduced by leaching with an acid or by other known techniques.

Alternatively, the sintering aid can be introduced to the polycrystalline precursor during sintering through infiltration from an external location. Infiltration of the sintering aid can also allow for increased superabrasive content in the final polycrystalline grits, e.g., about 90 vol %. Typically, infiltration can be achieved by placing the sintering aid in a location which is oriented above the superabrasive particles such that upon heating, the sintering aid will melt and flow through interstitial pores toward the superabrasive particles. However, capillary action can be a sufficiently strong driving force to allow sintering aid to flow up through interstitial pores to allow the superabrasive particles to be placed above the sintering aid.

Additionally, during sintering, superabrasive particles tend to grow and consolidate through a process of grain coarsening. Typically, substantial grain coarsening can be undesirable in the present invention. Therefore, ceramic particles or non-superabrasive particles can be added to the slurry to prevent substantial growth of diamond and/or cBN particles. Suitable non-superabrasive particles can include, but are not limited to, WC, SiC, or the like.

In yet another optional embodiment, the slurry can further include abrasive particles in addition to the superabrasive particles. This allows for decreased cost and increased impact strengths. Suitable abrasive particles can include, but are not limited to, titanium carbide, titanium nitride, aluminum nitride, silicon carbide, silicon nitride, silicon carbide, zirconium, alumina, silicon oxide, or mixtures of these particles.

As mentioned above, the abrasive slurry can include a binder. Typically, the binder can be any material which acts to adhere the abrasive particles together. Further, it is frequently desirable that the binder be a fugitive binder such that heating or other binder removal processes leave substantially no residue on the abrasive particles. Excessive or substantial amounts of residue or foreign material can interfere with sintering of the abrasive particles and reduce the quality of the final polycrystalline grits. Non-limiting examples of suitable binders can include polyethylene glycol, polyvinyl alcohol, wax, paraffin, naphthalene, polyvinyl butyral, phenolic resin, wax emulsions, acrylic resins, and mixtures thereof. In one detailed aspect, the binder can be polyethylene glycol. Generally, the binder can comprise from about 10 vol % to about 50 vol % of the abrasive slurry. This range is only exemplary, as practical amounts of binder can depend on the method used to form the abrasive precursors and the specific materials used, as discussed further below.

In another more detailed aspect of the present invention, the abrasive slurry can further include a liquid thinner. The liquid thinner can be any liquid which can reduce the viscosity of the abrasive slurry sufficient for formation of the abrasive precursors. Non-limiting examples of suitable liquid thinners can include acetone, hexane, water, glycols, alcohols, weak acids, toluene, trichloroethane, dilute sodium hydroxide, potassium hydroxide, methanol, ethanol, and mixtures thereof. If used, liquid thinners typically comprise from about 1 vol % to about 20 vol % of the abrasive slurry, depending on the method used to form the abrasive precursors.

The abrasive slurry can be formed into a plurality of abrasive precursors arranged on a substrate. The abrasive precursors can be formed using any number of techniques such as, but not limited to, printing techniques, templates, or any known method of forming slurry into a predetermined pattern of discrete masses. Non-limiting examples of suitable printing techniques can include lithographic techniques such as screen printing, offset lithography, flexography, gravure printing, or the like. In one aspect, the abrasive slurry can be printed using screen printing. Screen printing can include emulsion or stencil printing using screen templates. The screen templates can be formed of woven materials such as wire mesh, stainless steel wire, glass, polyester, nylon, cotton organdie, silk, or the like. Screen printing devices can include flat-bed, cylinder, rotary, or other known devices. Screen templates can provide a wide variety of print patterns to correspond to a desired cross-sectional shape for the abrasive precursors. Typically, the screen template can produce abrasive precursors having square or rectangular cross-sectional shapes. However, almost any useful cross-section can be produced, as known to those skilled in the screen printing arts.

Alternatively, the abrasive slurry can be formed into abrasive precursors using a template. The template can be designed such that the openings correspond to the desired arrangement of abrasive precursors. Suitable templates can be formed of almost any material in which a pattern of apertures can be formed. Further, apertures in the template can be sized to form abrasive precursors of a designed three-dimensional size and shape. The apertures can be square, rectangular, circular, triangular, hexagonal, cross-shaped, or any other practical shape. Typically, square or rectangular shaped abrasive precursors are desirable for production of abrasive polycrystalline grits. Generally, the template can be formed of a metal sheet such as stainless steel, nickel, aluminum, or hard plastics. However, other materials such as polymeric, ceramic, or composite materials can also be used to form the template. In one aspect of the present invention, the template can be prepared by forming holes which extend completely through the material or only partially through the material to form a divot or indentation. The holes can be formed using any known method such as mechanical or chemical methods. Several examples can include laser drilling, micro-drilling, computer numerically controlled (CNC) drilling, chemical etching, and the like.

Figure 1:
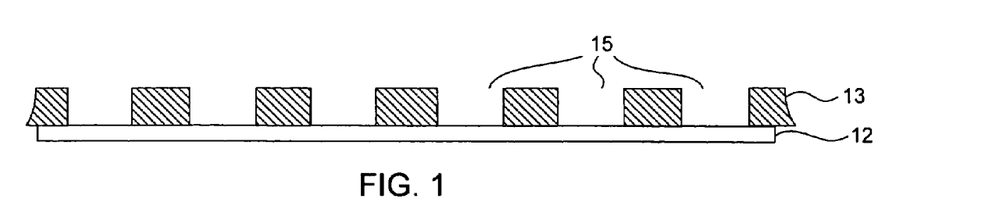
FIG. 1 is a side cross-sectional view of a template on a substrate in accordance with an embodiment of the present invention.
Figure 2:
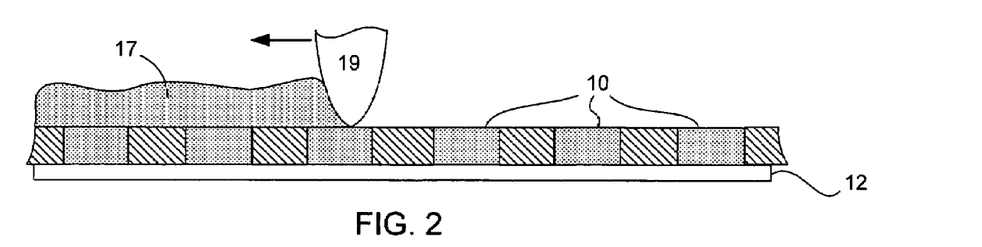
FIG. 2 is a side cross-sectional view of an abrasive slurry formed into a plurality of abrasive precursors on a substrate in accordance with an embodiment of the present invention.

Referring now to FIG. 1, a substrate 12 is shown having a template 13 thereon with a plurality of apertures 15. The apertures correspond generally to the desired abrasive precursor shape. As shown in FIG. 2, the slurry 17 can be distributed over the template such that a portion of the slurry fills each aperture. A blade 19 or other device can be used to remove excess slurry to form individual abrasive precursors 10. The template can then be removed either prior to or subsequent to dewaxing, as described below. Alternatively, the template can be left in place as a portion of the pressure medium. Typical templates of stainless steel or the like can be removed subsequent to sintering using a strong acid such as warm aqua regia.

In yet another alternative embodiment, the abrasive precursors can have a designed three-dimensional shape which can have varying cross-sectional areas such that the abrasive precursors can have tapered configurations. For example, pyramidal, prismatic, parallelepiped, cylindrical, and other similar shapes can be produced. These three-dimensional shapes can be formed by printing multiple layers of abrasive slurry such that each subsequent layer corresponds to a change in the contours of the abrasive precursor to form the desired three-dimensional shape. Typically, a pattern of abrasive slurry can be printed on the substrate. Any excess solvent or liquid thinner can then be driven off to at least partially harden the printed portions. This process can be repeated by printing adjacent layers either directly on one another or by stacking printed layers to form a three-dimensional pattern in order to achieve a desired abrasive precursor height. Further, each layer can be printed with differing patterns such that abrasive precursors can have a vertical profile, e.g., conical, pyramidal, etc. Various shapes and configurations can be achieved using screen printing or other printing techniques which are known to those skilled in the printing arts.

Regardless of the method used to form the abrasive precursors, the arrangement of abrasive precursors can involve a wide variety of spacings and abrasive precursor shapes. Typically, the abrasive precursors can be spaced having a pitch (center-to-center distance) which is about three times that of the abrasive precursor diameter. However, as a general guideline, the pitch of abrasive precursors on the substrate can range from about 1.2 to about 10, and preferably from about 1.5 to about 4 times the abrasive precursor diameter. In another aspect, the edge-to-edge distance between abrasive precursors can be from about 1 to about 10 times the diameter of the abrasive precursors. The spacing between abrasive precursors is generally a compromise between yield of abrasive polycrystalline grits and quality of the abrasive polycrystalline grits. Specifically, as the abrasive precursors are placed closer together, there is a greater risk that adjacent grits will grow together. Those skilled in the art can choose materials and conditions which can minimize this affect based on the teachings disclosed herein.

In addition, as mentioned above, the abrasive precursors can be formed having a variety of designed three-dimensional shapes such as, but not limited to, cubic, rectangular prism, blocks, cylinder, combinations thereof, or the like. As such, the abrasive precursors can have cross-sectional shapes such as square, rectangular, circular, elliptical, triangular, pentagonal, hexagonal, or the like. Most often, desirable shapes include edges which can be useful in abrasive applications. Specific examples of suitable three-dimensional shapes can include cubes, rectangular blocks, triangular blocks, pentagonal blocks, or the like.

In an additional aspect of the present invention, the substrate can be any suitable material which can be useful to retain the abrasive precursors in the desired arrangement during formation of the abrasive precursors and sintering of the abrasive particles. The substrate can be formed of any material which has sufficient integrity to allow formation of abrasive precursors thereon. Thus, almost any material can be suitable including, but not limited to, metal foils, metal plates, films, polymeric sheets, paper, or the like. In some embodiments, the substrate can comprise a sintering aid which provides an additional source of sintering aid to the abrasive precursors. Suitable substrates can comprise a metal or nonmetal material, generally provided in the form of a thin disk or sheet. Non-limiting examples of suitable substrate materials can include cobalt, nickel, iron, copper, sodium chloride, hexagonal boron nitride, graphite, stainless steel, corundum, and alloys, mixtures, or composites thereof. Additional materials which can be suitable for use in the substrate can include titanium, tungsten, tantalum, nickel, zirconium, zinc, vanadium, chromium, steel, silicon carbide, quartz, silicon nitride, boron nitride, tungsten carbide, titanium carbide, and zirconium carbide, zinc oxide, zirconia, aluminum nitride, titanium nitride, and zirconium nitride, and mixtures, alloys or composites thereof. Typically, the substrate can have a thickness from about 30 µm to about 500 µm, although thicknesses outside this range can also be used. For convenience in processing, the substrate can be provided as a single sheet which is then cut or otherwise separated into smaller segments subsequent to formation of the abrasive precursors thereon. The smaller segments can be sized for placement in a particular high pressure device. Optionally, the substrate can be cut into smaller segments prior to formation of abrasive precursors thereon.

Subsequent to forming the abrasive precursors and prior to sintering, the binder and other organic materials can be removed in a dewaxing process. Dewaxing can be performed to increase the coherence and integrity of the abrasive precursors. Further, dewaxing can remove substantially all organic materials, e.g., binder, liquid thinner, etc. Excessive residual organic materials can interfere with sintering and reduce the integrity and mechanical strength of polycrystalline grits produced thereby. Typically, dewaxing can be accomplished in a two step process including drying, or solvent removal, and then heating to dewax or remove the binder. This dewaxing process preferably provides sufficient heat to remove substantially all organic materials from the abrasive precursors. As a general rule, initial heating of the abrasive precursors to a temperature from about 90° C. to about 120° C., followed by heating to about 550° C. to about 700° C. can provide adequate results. Most often, dewaxing is performed under a vacuum with an inert atmosphere such as hydrogen, nitrogen, argon, or the like. Optionally, an additional oxidation step can be used to partially degrade the binder into smaller molecules, especially when polymeric binders are used. This additional step can be typically performed at an intermediate temperature around 350° C.

Figure 3:
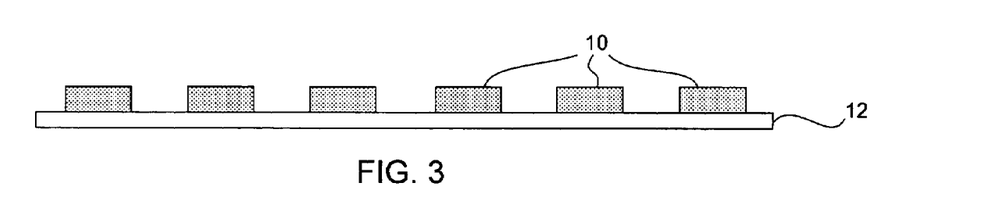
FIG. 3 is a side cross-sectional view of a portion of a dewaxed plurality of abrasive precursors in accordance with an embodiment of the present invention.

FIG. 3 illustrates the abrasive precursors 10 of FIG. 1, subsequent to dewaxing. As roughly indicated in the figures, depending on the volume content of organic materials in the abrasive slurry, the dimensions of the abrasive precursor can change somewhat during the dewaxing process. In order to achieve a desired final polycrystalline grit size, compensation for such shrinkage can be made. Typically, shrinkage can cause up to about 50% change in dimensions such as height and width, although values outside this range can also occur depending on the solvent and binder content, e.g., a 33% volume reduction is typical.

Figure 4:
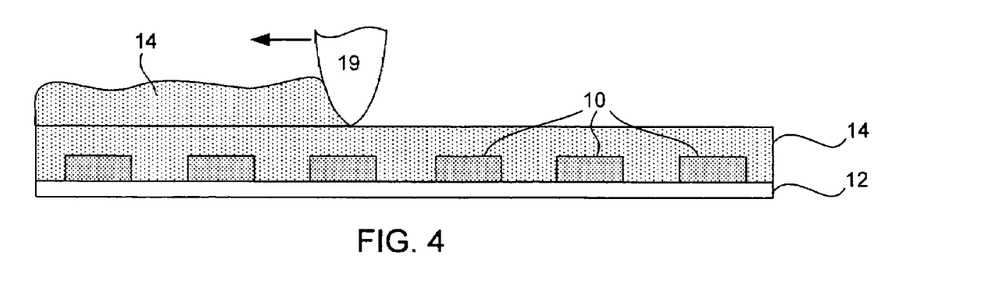
FIG. 4 is a side cross-sectional view showing a pressure medium covering the abrasive precursors in accordance with an embodiment of the present invention.
Figure 5:
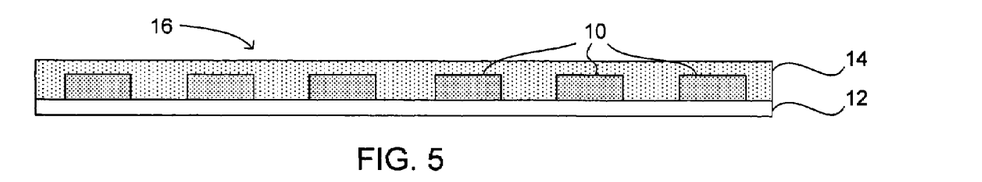
FIG. 5 is a side cross-sectional view showing a consolidated precursor assembly in accordance with an embodiment of the present invention.

In accordance with an aspect of the present invention, the abrasive precursors can be at least partially covered with a pressure medium to form a precursor assembly. FIG. 4 illustrates a pressure medium 14 completely covering the abrasive precursors 10. Additionally, the pressure medium can at least partially separate the abrasive precursors. The pressure medium can be distributed over the abrasive precursors and excess material removed using a blade 19 or other similar device. Further, although not required, it is often desirable to press the pressure medium 14 to at least partially consolidate the pressure medium around the abrasive precursors 10, as shown in FIG. 5, to form a precursor assembly 16. As shown in FIG. 5, partially consolidating the pressure medium and abrasive precursors will typically reduce the volume of the precursor assembly.

Figure 9:
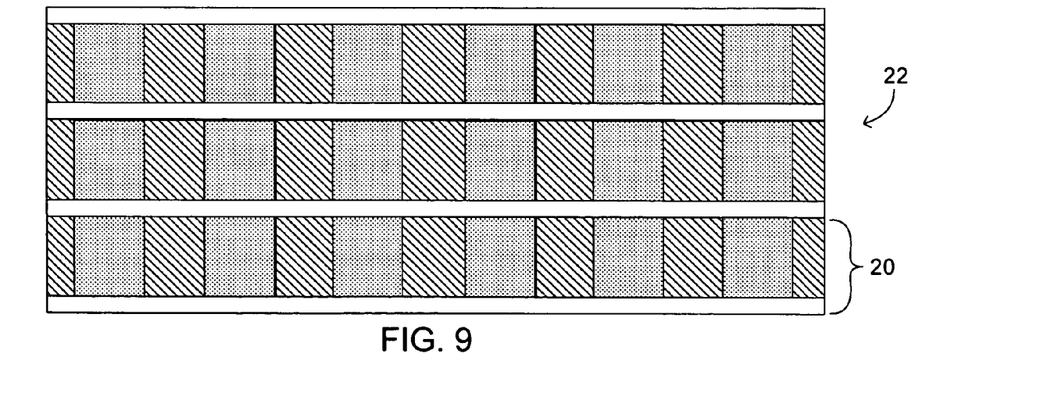
FIG. 9 is a side cross-sectional view of a multi-layered precursor assembly in accordance with another embodiment of the present invention.

In one aspect of the present invention, the pressure medium can comprise a material which aids in maintaining the integrity of the precursor assembly during sintering. A wide variety of materials can be suitable for this purpose such as, but not limited to, NaCl, Co, Cu, pyrophillite, dolomite, talc, metal oxides, hexagonal boron nitride (hBN), graphite, and combinations thereof. Currently preferred materials for use as a pressure medium include NaCl, hBN, and graphite. However, the most preferred pressure medium is NaCl. Sodium chloride is easily removed subsequent to sintering by dissolving in water. Additionally, although salt normally melts at low temperatures, under high pressures the melting point of salt substantially increases. Thus, at typical sintering pressures (about 5.5 GPa) salt provides an excellent pressure medium with low shear strength allowing pressure to uniformly distribute throughout the precursor assembly. Alternatively, the pressure medium can include the template and/or substrate used to form the precursor assemblies (as shown in FIG. 9). In such embodiments, suitable materials can include stainless steel, copper, or the like.

Optionally, the pressure medium can further include a refractory metal, or refractory metal carbide which can be used to adjust the softness of the pressure medium. Non-limiting examples of suitable additives for the pressure medium can include, but are not limited to, SiC, WC, TiC, and mixtures thereof.

Figure 6:
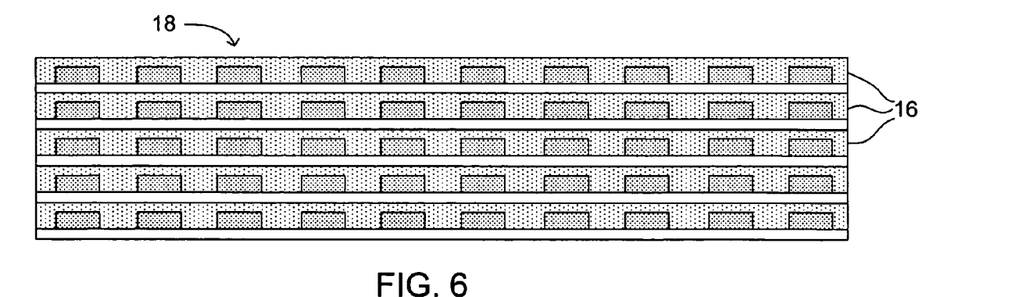
FIG. 6 is a side cross-sectional view of a multi-layered precursor assembly in accordance with an embodiment of the present invention.

In an additional optional embodiment, a plurality of precursor assemblies can be assembled to form a multi-layered precursor assembly. FIG. 6 illustrates one possible arrangement of precursor assemblies 16, wherein the abrasive precursors of each precursor assembly align vertically across the multi-layered precursor assembly 18. As shown, the illustrated precursor assemblies only depict a portion of the entire assembly. Typically, a single precursor assembly can contain dozens or hundreds of abrasive precursors, while a multi-layered precursor assembly can contain several tens of thousands of individual abrasive precursors. For example, typical reaction volumes for high pressure-high temperature (HPHT) devices can range from about 1 cm$^3$ to about 1000 cm$^3$. Further, diameters of the precursor assemblies can range from about 5 mm to about 10 cm, and typically from about 1 cm to about 10 cm, depending on the type of HPHT device used. Similarly, typical abrasive precursors can measure from about 0.5 µm to about 4 mm, and preferably from about 37 µm to about 1 mm. Additionally, the present invention also allows for production of ultra-fine polycrystalline grits having an average size from about 0.5 µm to about 2 µm. As such, the abrasive precursors typically occupy from about 1 vol % to about 50 vol % of the precursor assembly. For example, the number of abrasive precursors present on a single precursor assembly in some embodiments can range from about 10 to about 70,000, depending on the precursor assembly size, number of layers, and grit size.

Figure 7:
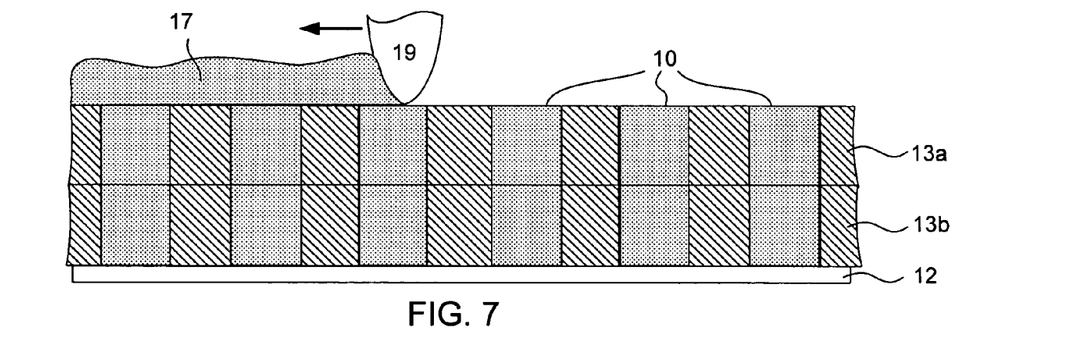
FIG. 7 is a side cross-sectional view stacked templates being filled with slurry in accordance with an embodiment of the present invention.
Figure 8:
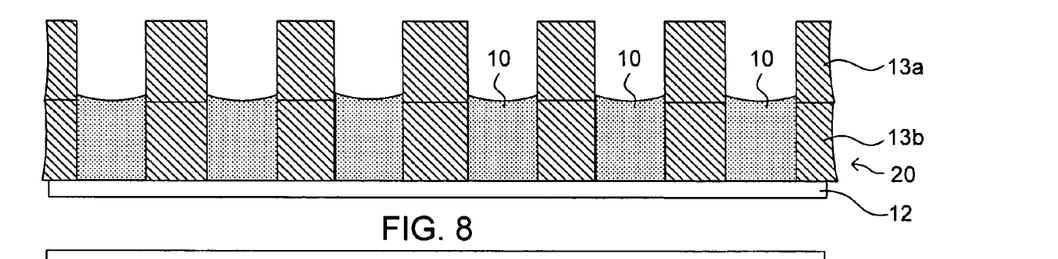
FIG. 8 is a side cross-sectional view of dewaxed abrasive precursors of FIG. 7.

In an additional optional embodiment, multiple templates can be stacked with apertures aligned during formation of abrasive precursors. In this embodiment, the final abrasive precursor lines up with a single template subsequent to dewaxing. Specifically, FIG. 7 illustrates an upper template 13a and a lower template 13b which are stacked. A slurry 17 is then distributed over the templates sufficiently to fill the apertures of both templates. As with other embodiments, excess slurry can be removed using a blade 19. FIG. 8 illustrates the abrasive precursors 10 subsequent to dewaxing and the accompanying volume reduction. In this embodiment, the thickness of the templates can be tailored to accommodate a slurry having a known solvent/binder content. For example, a slurry having a binder content of about ⅓ can be used in connection with a lower template having a thickness twice that of the upper template. In this way, the height of the abrasive precursor 10 approximately matches the thickness of the lower template 13b. The upper template can then be removed and the lower template left in place to provide support during sintering and can also serve as a portion of the pressure medium.

The precursor assembly 20 can then be stacked with other assemblies to form a multi-layered precursor assembly 22 as shown in FIG. 9. Thus, in some embodiments, the pressure medium can comprise a substrate and template which are chosen of suitable materials for use in high pressure sintering. Currently preferred materials for use in this embodiment as the substrate and template can include stainless steel and copper. Optionally, many of the materials discussed above with respect to pressure medium and substrates can also be used. Additionally, under typical sintering conditions steel becomes soft and deformable such that it can allow distribution of pressure toward the abrasive precursors.

In accordance with the present invention, the precursor assembly can be placed in a device capable of sintering the abrasive particles to form an assembly of sintered polycrystalline grits. Any device which is capable of producing sufficiently high pressures and temperatures to cause sintering of the abrasive particles can be used. Non-limiting examples of several suitable high pressure devices can include cubic presses, multi-anvil presses, belt presses, toroidal presses, piston-style presses, and the like. Sintering conditions can vary considerably from one material to another. For example, sintering pressures for diamond and cBN can range from about 4 GPa to about 7 GPa, and typically up to about 5.5 GPa in the case of diamond. Similarly, temperatures can vary depending on the material; however, for diamond superabrasive particles, temperatures of about 1300° C. are suitable, while for cBN, temperatures of about 1500° C. are typical. The sintered polycrystalline grits typically can correspond to the original abrasive precursors with slight changes in dimensions due to volume reductions during sintering. Thus, the assembly of sintered polycrystalline grits can include a plurality of discrete polycrystalline grits separated by consolidated pressure medium.

Subsequent to sintering, the assembly of sintered polycrystalline grits can be removed from the high pressure device. Individual polycrystalline grits can then be recovered using any number of techniques. Recovery of polycrystalline grits of the present invention can be readily accomplished by crushing, solvents, combinations thereof, or the like. When crushing the assembly, the pressure medium tends to fracture and break apart without damaging the polycrystalline grits. Similarly, solvents can be used to dissolve or otherwise weaken the pressure medium sufficiently to allow recovery of polycrystalline grits. Frequently, the pressure medium can be chosen so as to facilitate release of polycrystalline grits from the sintered assembly. For example, a pressure medium of sodium chloride can be readily crushed and/or dissolved using heated aqueous solutions or other common solvents. In one aspect of the present invention, the recovered polycrystalline grits can have substantially unaltered surfaces such that the recovered polycrystalline grits can be used in abrasive applications without further modification of surfaces of the polycrystalline grits. Typically, the polycrystalline grits can be substantially unchanged in shape, surface roughness, and/or other properties by the recovery process.

Additional cleaning steps can sometimes be required to remove residual debris, metals, or pressure medium from the polycrystalline grits. However, such cleaning steps typically do not change the shape, surface properties, or integrity of the polycrystalline grits. Similarly, the polycrystalline grits can be burnish milled or otherwise treated to remove undesirable defects or protrusions, e.g., residual metals, debris, or sintered bodies resulting from defects in the formation process. Alternatively, residual sintering aid inclusions can be leached out by soaking in acid over an extended period of time. Removal of sintering aid from the final abrasive polycrystalline grits helps to improve thermal stability. In many cases, the polycrystalline grits of the present invention can be thermally stable up to temperature of about 1100° C.

A wide range of polycrystalline grit sizes and shapes can be produced, as discussed in connection with formation of the abrasive precursors. Typically, the polycrystalline grits can have an average size from about 400 mesh to about 10 mesh, and preferably from about 325 mesh to about 18 mesh, depending on the specific intended application. The methods of the present invention further allow production of large amounts of polycrystalline grits having highly uniform size distributions. In accordance with the present invention, the polycrystalline grits can have substantially uniform sizes and shapes to within several micrometers. However, as a broad matter, the polycrystalline grits can have a uniform size distribution characterized by a size distribution of less than about 50 µm, preferably less than about 10 µm, and in many cases less than about 5 µm. Preferably, the final polycrystalline grits can comprise greater than 80 vol % abrasive, e.g., diamond, cBN, or the like.

In accordance with the present invention, the polycrystalline grits can have substantially uniform shapes and sizes. As a result, polycrystalline grits can be supplied having substantially uniform sizes without the time and cost of segregating different size grits or otherwise sorting the grits. Additionally, substantially uniform polycrystalline grits can improve performance in abrasive applications by allowing for microfracturing of the grits rather than macrofracturing. Specifically, the polycrystalline structure allows small portions of the grit to fracture without causing catastrophic failure of the entire grit. Additionally, the constant microfracturing of each grit allows for a continual renewal of sharp edges on the grit which helps to maintain cutting speed. Further, polycrystalline grits of the present invention tend to be relatively rough as compared to single crystal diamonds. This increased roughness allows for improved bonding with various tools.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of forming polycrystalline grits, comprising the steps of:
    a) forming an abrasive slurry into a plurality of abrasive precursors arranged on a substrate by screen printing, said abrasive slurry including a binder and a plurality of abrasive particles;
    b) at least partially covering the abrasive precursors with a pressure medium to form a precursor assembly;
    c) sintering the abrasive particles to form polycrystalline grits; and
    d) recovering the polycrystalline grits.

2. The method of claim 1, wherein the abrasive particles are selected from the group consisting of diamond, nano-diamond, cubic boron nitride, silicon carbide, quartz, corundum, silicon nitride, boron nitride, tungsten carbide, titanium carbide, zirconium carbide, zinc oxide, zirconia, alumina, aluminum nitride, titanium nitride, zirconium nitride, and mixtures or composites thereof.

3. The method of claim 2, wherein the abrasive particles are superabrasive particles.

4. The method of claim 3, wherein the abrasive particles are diamond.

5. The method of claim 3, wherein the abrasive particles are cubic boron nitride.

6. The method of claim 3, wherein the abrasive particles include both diamond and cubic boron nitride particles.

7. The method of claim 1, wherein the abrasive particles include a mixture of superabrasive and non-superabrasive particles.

8. The method of claim 1, wherein the abrasive slurry further comprises a sintering aid.

9. The method of claim 1, wherein the substrate comprises a member selected from the group consisting of cobalt, nickel, iron, copper, sodium chloride, hexagonal boron nitride, graphite, and alloys or composites thereof.

10. The method of claim 1, wherein the binder is a member selected from the group consisting of polyethylene glycol, polyvinyl alcohol, wax, paraffin, naphthalene, polyvinyl butyral, phenolic resin, wax emulsions, acrylic resins, and mixtures thereof.

11. The method of claim 1, wherein said abrasive slurry further comprises a liquid thinner.

12. The method of claim 1, further comprising the step of dewaxing prior to the step of sintering.

13. The method of claim 1, wherein the pressure medium comprises a member selected from the group consisting of NaCl, Co, Cu, hexagonal boron nitride, graphite, and combinations thereof.

14. The method of claim 1, wherein the pressure medium further comprises a metal carbide.

15. The method of claim 1, wherein the pressure medium comprises stainless steel or copper.

16. The method of claim 1, further comprising the step of assembling a plurality of precursor assemblies to form a multi-layered precursor assembly.

17. The method of claim 1, wherein the abrasive precursors have a designed three-dimensional shape.

18. The method of claim 17, wherein the designed three-dimensional shape is selected from the group consisting of cubic, rectangular prism, blocks, cylinder, and combinations thereof.

19. The method of claim 1, wherein the abrasive particles have an average particle size from about 3 nm to about 500 µm.

20. The method of claim 1, wherein the abrasive particles have an average particle size from about 1 µm to about 50 µm.

21. The method of claim 1, wherein the polycrystalline grits have an average size from about 0.5 µm to about 4 mm.

22. The method of claim 21, wherein the polycrystalline grits have an average size from about 0.5 µm to about 2 µm.

23. The method of claim 21, wherein the polycrystalline grits have an average size from about 40 µm to about 1 mm.

24. The method of claim 1, wherein the polycrystalline grits have a substantially uniform size and shape.

25. The method of claim 24, wherein the polycrystalline grits have a uniform size distribution characterized by a size distribution of less than about 50 µm.

26. A method of forming polycrystalline grits, comprising the steps of:

a) forming an abrasive slurry into a plurality of abrasive precursors arranged on a substrate, said abrasive slurry including a binder, a sintering aid, and a plurality of abrasive particles, said abrasive particles being selected from the group consisting of diamond, cubic boron nitride, nanodiamond, and combinations thereof, wherein forming the plurality of abrasive precursors is accomplished by screen printing;

b) dewaxing the abrasive precursors to remove substantially all of the binder;

c) at least partially covering the abrasive precursors with a pressure medium to form a precursor assembly;

d) forming a plurality of precursor assemblies and stacking said precursor assemblies to form a multi-layered precursor assembly;

e) sintering the abrasive particles to form polycrystalline grits; and f) recovering the polycrystalline grits.

* * * * *